April 15, 1930.    C. A. ISELIN    1,754,753
SELF ADJUSTING WRIST PIN
Filed Nov. 4, 1929
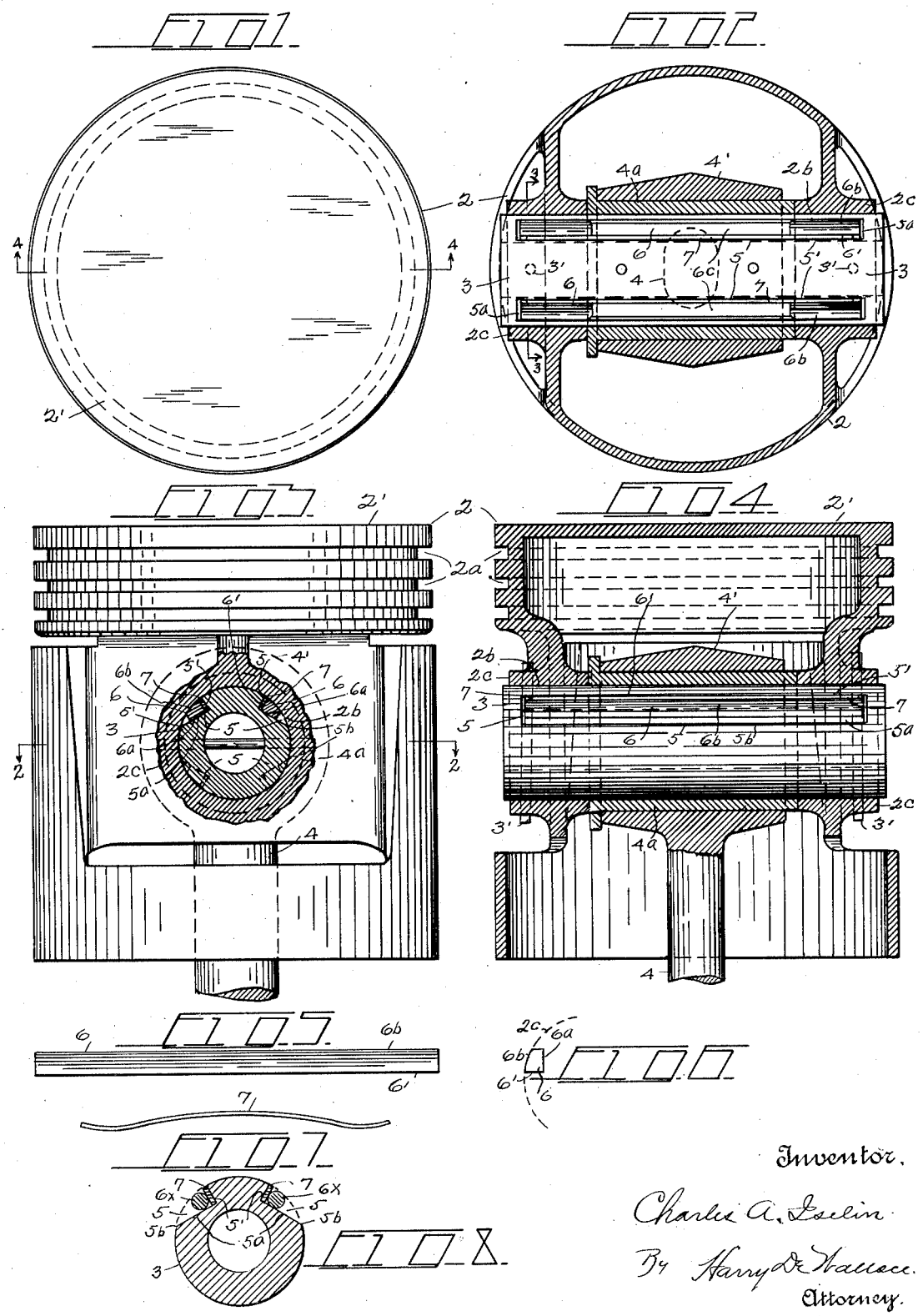
Inventor,
Charles A. Iselin
By Harry De Wallace.
Attorney.

Patented Apr. 15, 1930

1,754,753

UNITED STATES PATENT OFFICE

CHARLES A. ISELIN, OF FULTON, NEW YORK, ASSIGNOR OF ONE-HALF TO ERVING ISELIN, OF SYRACUSE, NEW YORK

SELF-ADJUSTING WRIST PIN

Application filed November 4, 1929. Serial No. 404,683.

This invention relates to self-adjusting wrist-pins, designed particularly for connecting the pistons and eccentric rods of internal combustion engines, and the like, and has for its object to provide novel construction and arrangement of the wrist-pin, whereby the wear and attendant looseness of the pin and related parts may be compensated for, to the end that all knocking, rattling and vibrating incident to said wear and looseness may be obviated automatically.

I attain these objects by the means set forth in the detailed description, which follows and is illustrated by the accompanying drawing, in which—

Figure 1 is a top plan view of the piston of an internal combustion engine. Fig. 2 is a horizontal section taken substantially on line 2—2 of Fig. 3, the wrist-pin being in plan. Fig. 3 is a side elevation and partial vertical cross-section, the latter being taken on line 3—3 of Fig. 2. Fig. 4 is a central vertical section taken on line 4—4 of Fig. 1. Fig. 5 is an enlarged elevational view of one of the take-up bars. Fig. 6 is an end elevation of the same. Fig. 7 is an elevational view of one of the springs. And Fig. 8 is a vertical cross-section of a wrist-pin to which is applied cylindrical take-up bars.

In the drawing, 2 represents generally the hollow cylindrical body of a piston common to internal combustion engines, having the usual closed top end 2', below which is disposed the piston ring grooves $2^a$, the said body being formed with a transverse bore $2^b$, in which is disposed the usual tubular wrist-pin, as 3. At the opposite ends of the bore, the body is formed with concentric hubs $2^c$, which are spaced to receive the cross-head comprising the upper end 4' of the piston rod, as 4, which is also bored to receive the wrist-pin and a bushing $4^a$, that separates said parts. In some engines the wrist-pins are made fast to the body 2, as by pins 3'; in other engines the wrist-pins are made rigid to the crosshead 4' of the rod, as shown by dotted lines, in Figs. 2 and 3.

In order to obviate knocking and vibrations due to the wearing away of the wrist-pin 3, or its bearings $2^c$, or $4^a$, I form the external surface of the tubular body 3 with parallel longitudinal grooves or recesses, as 5, and dispose in said grooves floatable bars or keys 6, with which are associated ribbon-springs 7, by which the bars are held resiliently against the inner circumference of the bearings $2^c$—$4^a$, with sufficient tension to thrust and hold the loosened wrist-pin in firm or snug engagement with the surfaces of said bearings diametrically opposite said bars. The shoulders or walls 5' of the grooves 5 are preferably truly radial, while the walls $5^a$ are disposed at right angles to the walls 5' and intersect the circumference of the wrist-pin at $5^b$. By this arrangement, the grooves are deepest at the walls 5', and thence taper toward the zero points $5^b$. This enables the keys or wedges 6, owing to the springs 7 being interposed between the walls 5' and the keys to be crowded into the laterally diminishing portions of the grooves and to take up any looseness due to the wearing away of either the wristpin or the bearings $2^c$—$4^a$. In the preferred construction, the bars 6 are formed with right angle surfaces 6'—$6^a$, which respectively conform to the surfaces 5'—$5^a$, while the outer faces $6^b$, are preferably of the same radius as the wrist-pin in order to provide relatively broad bearings, rather than merely point contacts, as shown in Fig. 8, wherein the bars $6^x$ are cylindrical.

The grooves 5 are shown disposed relatively close together, preferably from 30° to 60° apart, and vanish obliquely in opposite directions, as best seen in Figs. 3 and 8. The grooves 5 are also preferably spaced equidistantly at either side of vertical axis of piston 2 and rod 4. In other words, the grooves 5 are so arranged that the take-up bars 6 exert their pressure substantially in the plane of the travel of the piston and rod, and whether said bars are disposed at the top or at the bottom of the wrist-pin, as shown by the full and broken lines in Fig. 3, the bars continually force and hold the opposing unbroken external surfaces of the wrist-pin in firm engagement with the top or bottom walls of the bearings $2^c$—$4^a$, and prevent knocking or vibrations, as explained.

When the wrist-pin is rigid to the cross-head

4' and loose in the bearings 2ᶜ, the faces 6ᵇ of the bars 6 are preferably cut away to the extent of the breadth of the cross-head, as shown at 6ᵉ of Fig. 2. By this provision, the bars only effectively engage the bearings 2ᶜ, and prevent knocking therein in case the wrist-pin wears away. When however, the wrist-pin is rigid to the piston 2, the surfaces 6ᵇ, are full throughout their length, as shown in Figs. 3, 4, 5, and 6. By this arrangement, as the wear of wrist-pin can only occur within the span of the cross-head, the bars will take up such wear, as explained.

In Fig. 8, the keys or bars 6ˣ are cylindrical, but they function substantially the same in all respects as the keys 6, excepting that the round keys make extremely narrow or point contacts with the bottoms 5ᵃ of the grooves and the bearings 2ᶜ. The keys 6ˣ are free to rotate and therefore distribute the wear upon them, as compared with keys 6, which always remain in substantially the same position.

Having thus described my invention, what I claim, is—

1. A non-expansible wrist-pin formed with spaced longitudinal grooves in its external surface, the facing sides of said grooves being radial, springs engaging said radial sides, and take-up bars loosely disposed in said grooves adapted to be moved in opposite directions laterally by the tension of said springs to take up looseness due to the wearing of the wrist-pin.

2. A wrist-pin having parallel external longitudinal grooves, said grooves being formed with radial walls and diminishing laterally in opposite directions toward the circumference of the wrist-pin, elongated keys disposed in the deepest portions of said grooves, and springs interposed between said radial walls and said keys adapted to crowd the keys laterally into the diminishing portions of said grooves.

3. The combination with a piston and an eccentric rod, of a tubular wrist-pin to connect said parts, the body of said wrist-pin having in its external surface parallel longitudinal grooves, formed with radial walls, and angular walls that extend obliquely in opposite directions towards the circumference of the body to effect the diminishing of the grooves laterally, elongated keys disposed in said grooves, and tension means to force the keys bodily away from said radial walls.

4. A wrist-pin to connect the piston and eccentric rod of an engine and the like, the external surface of said wrist-pin being formed with parallel angular longitudinal grooves, corresponding walls of the grooves being arranged radially, the other walls thereof being disposed at right angles to the radial walls and extending to the circumference of the wrist-pin to effect the diminishing of the depth of the grooves laterally, elongated bars loosely disposed in said grooves, and springs interposed between said radial walls and said bars adapted to crowd the bars into the laterally diminishing portions of the grooves.

5. A wrist-pin to connect the piston and eccentric rod of an engine and the like, said wrist-pin having angular longitudinal grooves formed in its circumference, the facing sides of said grooves being radial, the bottoms of said grooves extending obliquely and vanishing at the circumference of the wrist-pin to effect the lateral diminishing of the said grooves, take-up keys loosely disposed in said grooves, and elongated springs interposed between said keys and said radial walls and exerting their tension to force the keys laterally in opposite directions to tighten the wrist-pin when the latter becomes warm.

In testimony whereof I affix my signature.

CHARLES A. ISELIN.